United States Patent [19]

Adolfsson et al.

[11] Patent Number: 4,493,995
[45] Date of Patent: Jan. 15, 1985

[54] FIBER OPTICAL MEASURING DEVICE WITH A FREQUENCY SENSITIVE TRANSDUCER

[75] Inventors: Morgan Adolfsson; Torgny Brogårdh; Christer Ovren; Anders Persson, all of Västerås, Sweden

[73] Assignee: Asea Aktiebolag, Västerås, Sweden

[21] Appl. No.: 376,142

[22] Filed: May 7, 1982

[30] Foreign Application Priority Data

May 8, 1981 [SE] Sweden ............................ 8102889

[51] Int. Cl.³ ................................................. G02B 5/14
[52] U.S. Cl. .................................. 250/227; 250/231 R; 455/612
[58] Field of Search ........................... 250/227, 231 R; 350/96.1, 96.24; 455/610, 612

[56] References Cited

U.S. PATENT DOCUMENTS

4,356,396 10/1982 Ruell et al. ........................... 250/227

*Primary Examiner*—David C. Nelms
*Attorney, Agent, or Firm*—Watson Cole Grindle & Watson

[57] ABSTRACT

The invention relates to a fiber optical measuring device for measuring physical quantities such as temperature and pressure, comprising a measuring transducer comprising a sensor material, an electronic unit comprising an evaluating electronic system, light sources and photo-detectors, and one or more optical fibers which connect said transducer to said electronic unit. The invention is characterised in that the sensor material has optical properties dependent on the modulating frequency of the light, such as absorption, reflection or luminescence; that the light from the electronic unit is arranged to be modulated by one or more frequencies; that at least one of these frequencies lies within the frequency range where the optical properties of the sensor material are influenced by at least one of said physical quantities; and that the modulating amplitude and/or the modulating phase position of the light emanating from the sensor material is/are arranged to be detected in the electronic unit at at least one of said modulating frequencies.

25 Claims, 11 Drawing Figures

FIG. 11

FIBER OPTICAL MEASURING DEVICE WITH A FREQUENCY SENSITIVE TRANSDUCER

BACKGROUND OF THE INVENTION

1. Field of the Invention

This invention relates to a fiber optical measuring device for measuring physical quantities, such as temperature and pressure, comprising a transducer comprising a sensor material, an electronic unit, and light-conducting fiber means connecting the transducer to the electronic unit.

The expression "light" which is used in this specification should be taken to include electromagnetic radiation within the UV range, the visible range, and the IR range.

2. Description of the Prior Art

It is previously known from U.S. patent application Ser. No. 194,397, filed in the names of Olov Engström and Christer Ovrén on Oct. 16th, 1980 now U.S. Pat. No. 4,376,890 and assigned with the present application to a common assignee, to provide a fiber-optic temperature-measuring apparatus in which a temperature is measured by illuminating a temperature-dependent photo-luminescent semiconductor material via one or more light-conducting fibers, sensing the absorption or luminescence of the illuminated semiconductor material via one or more light-conducting fibers, and utilizing the measured absorption and luminescence values to obtain a measure of the temperature of the semiconductor material. However, a disadvantage with this known apparatus is that it is very sensitive to variations in fiber damping and drift of light sources and detectors and therefore it is necessary to provide a spectral analysis of the light from the semiconductor material.

The present invention aims to provide a solution to the above-mentioned problems and other problems associated therewith. The problems are eliminated by measuring the dynamics of the absorption or luminescence processes instead of measuring the absolute values of the absorption or the luminescence.

SUMMARY OF THE INVENTION

According to the present invention a fiber optical measuring device for measuring physical quantities, e.g. temperature, pressure, comprises a transducer comprising a measuring transducer comprising a sensor material having at least one optical property dependent on the modulating frequency of light supplied thereto; an electronic unit; and light-conducting fiber means connecting the measuring transducer to the electronic unit; the electronic unit including light source means for transmitting excitation light via the fiber means to the sensor material, modulating means arranged so that said excitation light is modulated at at least one modulating frequency, which at least one modulating frequency lies within a frequency range in which said optical property of the sensor material is influenced by the physical quantity to be measured, and means for detecting the amplitude and/or phase position of the modulated light emanating from the sensor material in response to excitation light at said one modulating frequency.

The dynamics of the device according to the invention can be varied within wide limits by utilizing as the sensor material different semiconductor materials, which can be given a variety of different dopings.

BRIEF DESCRIPTION OF THE DRAWINGS

The invention will now be described, by way of example, with reference to the accompanying drawings, in which.

DESCRIPTION OF THE PREFERRED EMBODIMENTS

In the ensuing description several different fiber optical measuring devices and systems are described. Wherever possible similar reference numerals have been employed to identify similar elements in the different embodiments.

Figure 1:
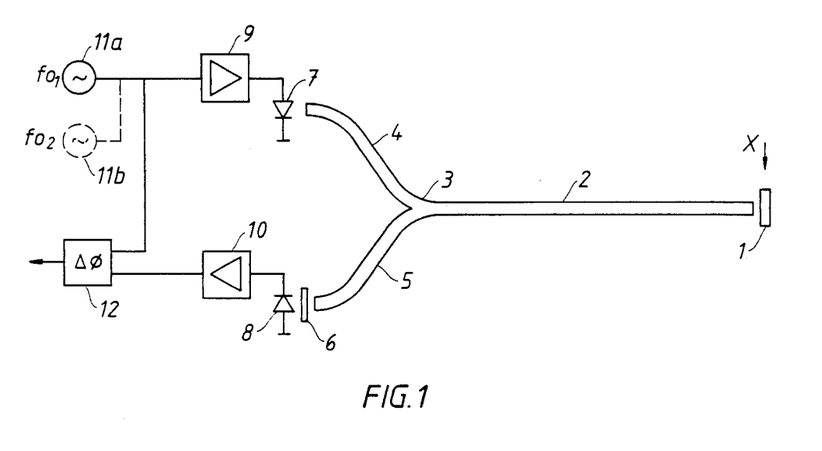
FIG. 1 shows one embodiment of a fiber optical measuring device according to the invention for measuring a physical quantity x.

FIG. 1 shows a fiber optical measuring system for measuring a physical quantity x, e.g. a pressure, which influences the luminescence dynamics in a sensor 1 within a transducer unit of the system. The system includes an oscillator 11a which modulates a light-emitting diode (LED) 7 via an amplifier 9. Excitation light from the LED 7 is transmitted via a light conducting fiber 4, a branch 3 and a light conducting fiber 2 to the sensor 1 and excites luminescence in the latter. The part of the luminescence that enters into the fiber 2 from the sensor 1 is conducted back along the fiber 2 to the branch 3, and part of the luminescent light is conducted further along a light conducting fiber 5, through a filter 6 and to a photo-diode 8. The filter 6 is used to suppress reflections in the fiber optics and the sensor which emanate from the excitation light from the LED 7. The output signal from the photo-diode 8 is amplified in an amplifier 10, and the output of the latter is connected to a phase detector 12 for measuring the phase difference between the excitation and luminescent signals. The difference signal from the phase detector 12 constitutes a measuring signal for the physical quantity x being measured. Because of the time of travel of the light in the fiber 2, a phase displacement dependent on fiber length is obtained which, at high modulating frequencies, may require a calibration of the measuring system. Since the time of travel is dependent on the modulating frequency, however, this calibration may be carried out automatically by measuring the phase displacement at two separate modulating frequencies, $f_{01}$ and $f_{02}$ produced by oscillators 11a and 11b, respectively. For example, if the phase displacement at $f_{02}$ is independent of the physical quantity x being measured, the phase position measurement in the phase detector 12 at $f_{02}$ may be used directly for calculating the time of travel in the fiber 2, whereupon the phase displacement in the sensor 1 at modulating frequency $f_{01}$ is obtained as $\Delta\phi$ minus the phase displacement at modulating frequency $f_{01}$ caused by the time of travel.

The measuring device according to FIG. 1 suffers from the disadvantage that it is not possible to measure great changes in the dynamics of the detecting sensor 1. In order to alleviate this disadvantage, a measuring system according to FIG. 2 can be used. In the measuring system shown in FIG. 2 the physical quantity to be measured influences the absorption dynamics of the sensor 1.

Figure 2:
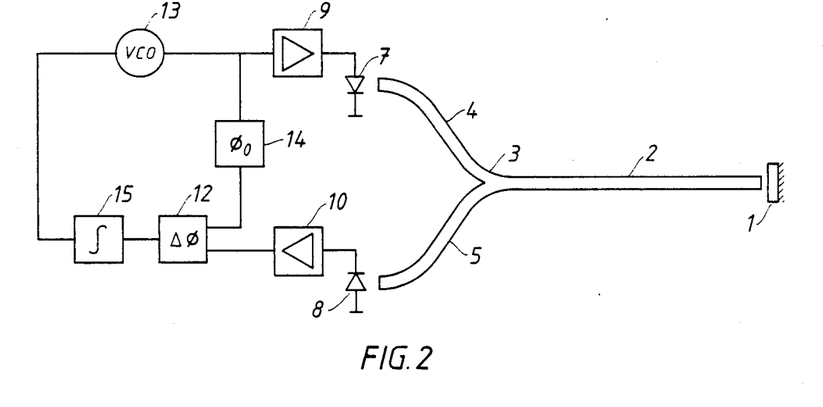
FIG. 2 shows another embodiment of a fiber optical measuring device according to the invention in which the physical quantity to be measured influences the absorption dynamics of sensor material of a transducer of the measuring device.

The measuring system shown in FIG. 2 includes a voltage-controlled oscillator 13 (VCO) which modulates a LED 7 via an amplifier 9, the light from the LED 7 being led via a light conducting fiber 4, a branch 3 and a light conducting fiber 2 to a semiconductor sensor 1. The light absorption of the semiconductor material in the sensor 1 is measured by allowing excitation light from the LED 7 to pass through the semiconductor material of the sensor 1, to be reflected towards the rear side thereof, to pass back through the semiconductor material and to be led, via the fiber 2, the branch 3 and a light conducting fiber 5, to a photo-diode 8. The output signal from the photo-diode 8 is amplified in the amplifier 10, and the phase position of its output signal is compared in a comparison device 12 with the phase position of the voltage-controlled oscillator 13 after the signal therefrom has been phase-displaced by a constant angle $\phi_0$ in a regulator 14. The output signal from the phase detector 12 controls a regulator 15 which regulates the voltage-controlled oscillator 13 in such a way that a constant phase displacement $\phi_0$ is obtained between the output of the amplifier 9 and the output of the amplifier 10. This means that the measuring system will follow the dynamics of the semiconductor material of the sensor 1 even though the changes in the dynamics are great. As previously mentioned, during phase measurement in the measuring systems according to FIGS. 1 and 2, problems may occur in that different fiber lengths give different times of travel of light, which contributes additionally to the measured phase difference. If a change is made from phase measurement to amplitude measurement, this problem will disappear. However, in this case the problem with varying time delay caused by the fibers is replaced by the problem with varying light attenuation caused by the fibers. In the same way as automatic compensation for varying time delay can be provided according to the previous description by measuring the phase shift at two different frequencies, a varying light attenuation can be compensated for by measuring the light amplitude at two different frequencies $f_1$ and $f_2$ as shown in the measuring system according to FIG. 3.

Figure 3:
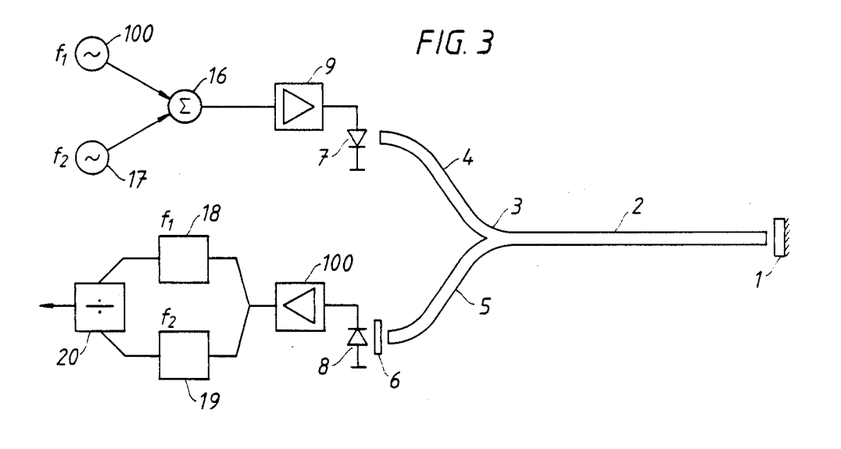
FIG. 3 shows another embodiment of a fiber optical measuring device according to the invention employing measurement at a fixed measuring frequency.

In the measuring system shown in FIG. 3 (e.g. a temperature measuring system), the frequencies $f_1$ and $f_2$ are derived from amplitude-stabilized oscillators 100 and 17 and are supplied to the LED 7 via a summator 16 and an amplifier 9. On the detector side of the measuring system the two frequency components are extracted by the filters 18 and 19, the quotient of the output signals of said filters being formed in a quotient forming means 20. If frequencies $f_1$ and $f_2$ are so chosen that the dynamic changes of the luminescence process in the sensor material of the transducer or sensor 1 influence the component with the frequency $f_1$ to a greater extent than the component with the frequency $f_2$, the output signal from the quotient forming means 20 will be a measured value which is compensated for instabilities in the optic and the opto-electronic system.

Frequency $f_1$ is suitably chosen to be of the same order as $1/\tau$, where $\tau$ is the time constant of the luminescence influenced by the physical quantity being measured, whereas frequency $f_2$ is chosen so low that the time constant $\tau$ of the transducer has no effect at all. The luminescence signal is often so small that the filters 18 and 19 should be realized with a lock-in amplifier technique to obtain a sufficiently great signal/noise ratio. However, a lock-in amplifier must be synchronized with the measuring signal. At low values of $\tau$, the time of travel of the light in the fibers may have an influence on the accuracy of measurement, in which case automatic synchronizing may be required. One method showing how such synchronizing can be implemented is described hereinafter with reference to FIG. 4.

Figure 4:
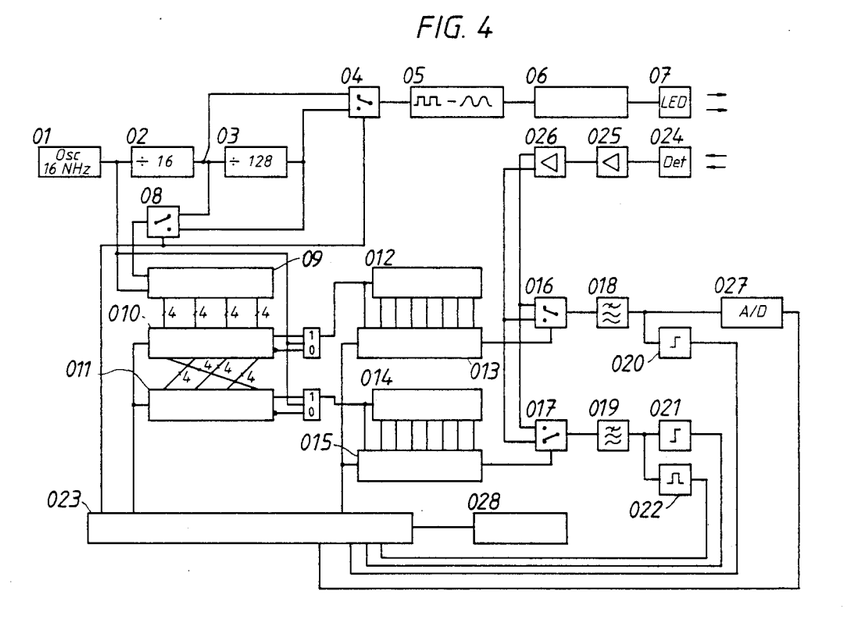
FIG. 4 shows a practical realization of the measuring device shown in FIG. 3 employing a lock-in amplifier technique.

The lock-in amplifier of the measuring system described has two measuring channels which are displaced 90° from each other and which operate so that the reference signal is delayed such that the measuring channel gives a maximum output signal, which occurs when the second channel gives 0 output signal. The phase dependence of the amplitude is much greater at zero passage than at maximum, and in addition the polarity provides information as to in what direction the reference signal is to be displaced (increased or decreased delay). The synchronizing takes place at the high measuring frequency and is uninfluenced at the low frequency, which is so low that the phase displacement has no effect on the amplitude. The output signal of the lock-in amplifier at low measuring frequency is used as a reference so that the signal at a high frequency is divided by the signal at a low frequency, and the ratio is a measure of the temperature of the transducer.

FIG. 4 shows a practical implementation of the measuring system shown in FIG. 3. In FIG. 4, a crystal-controlled oscillator 01 of 16 MHz provides, after reduction in counters 02 and 03, two measuring frequencies of 1 MHz and 7.81 MHz. In a selector 04 the measuring frequency is selected and this is transformed in a current converter 05 into a sinusoidal signal which is supplied, via a modulator 06, to a LED 07. A selector 08 is set in parallel with the selector 04 and provides an input signal to a sixteen bit shift register 09. The shift register 09 is clocked with 16 MHz, and the delay is thus one whole period at a measuring frequency of 1 MHz. The delay is set by means of selectors 010 and 011. The selector 011 is displaced four bits in relation to the selector 010 and this gives a phase displacement of 90° between selectors 010 and 011. The shift register 09 and the selectors 010 and 011 enable phase setting in stages of 22.5 degrees. This is not a sufficiently high resolution and therefore the delay is used in a number of series-connected gates, 012 and 014, for fine setting. It should be noted that selectors 013 and 015 are set in parallel with each other at a delay of an equal number of stages. This is also true of the selectors 010 and 011. Reference numerals 016 and 017 designate switches in two lock-in amplifier channels each having respective low-pass filters 018 and 019. A comparator 020 gives the polarity of the signal in the measuring channel, and a comparator 021 and a monoflip-flop 022 give polarity and amplitude respectively, in the other channel. The signals from elements 020, 021 and 022 are evaluated in a microcomputer 023 and this in turn gives a signal first to selectors 010 and 011 for coarse setting and then to selectors 013 and 015 for fine setting of the phase position. The setting takes place at 1 MHz and with a large and a small step, respectively, at a time. The input signal supplied to the lock-in amplifier comes from a photodiode 024 via amplifiers 025 and 026. When the synchronizing is finished, the output signal of the measuring channel is measured with an A/D converter 027 both at 1 MHz and at 7.81 MHz. The ratio is computed in the microcomputer 023, and via a table programmed in the computer, the temperature to be measured is obtained which is displayed on a display 028.

Figure 5:
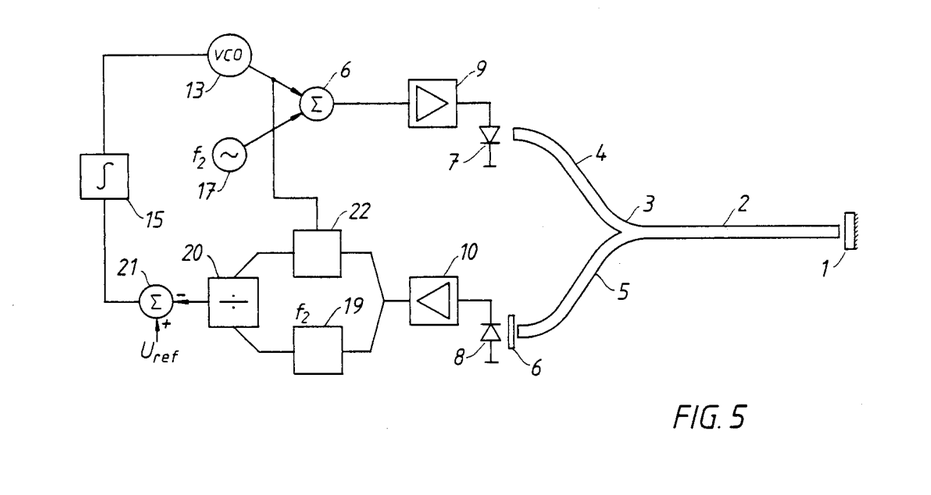
FIG. 5 shows another embodiment of a fiber optical measuring device according to the invention employing a frequency-variable oscillator.

The system according to FIG. 3 operates in a manner analogous to the system according to FIG. 1 at a fixed measuring frequency $f_1$. Therefore, at greater variations of the sensor dynamics, a system with a voltage-controlled oscillator according to FIG. 5 should be used instead. In the measuring device shown in FIG. 5, the quotient from the quotient forming means 20 is compared in a summator 21 with a reference value $U_{ref}$. The error signal thus obtained is coupled to a regulator 15 which controls a voltage-controlled oscillator 13. To obtain an accurate filtering out of the detector signal at the variable frequency of the oscillator 13, a phase-controlled filtering is made in a flip-flop 22.

The measuring systems shown in FIGS. 3 and 4 constitute systems for measuring the dynamic properties of the luminescence. If, instead, absorption is to be measured, reflections in the optic system cannot be filtered away optically, and instead three modulating frequencies $f_1$, $f_2$ and $f_3$ must be used, the modulating frequencies $f_1$ and $f_2$ then being selected as in FIGS. 3 and 4 whereas the modulating frequency $f_3$ is selected higher than the modulating frequency $f_1$, which corresponds to $1/\tau$, where $\tau$ is the time constant of the absorption process of the sensor material.

Figure 6:
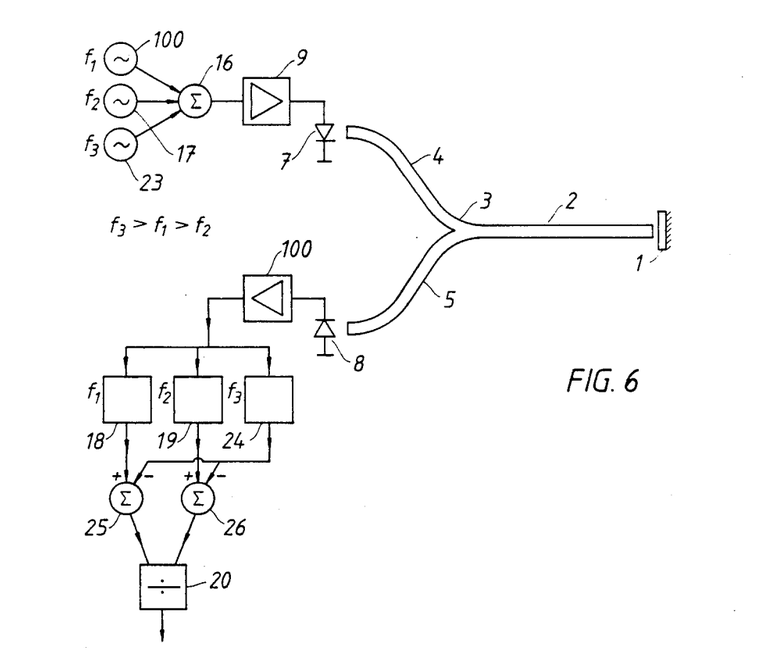
FIG. 6 shows another embodiment of a fiber optical measuring device according to the invention for measuring at three modulating frequencies.

FIG. 6 shows a measuring system for amplitude measurement at the three modulating frequencies $f_1$, $f_2$ and $f_3$, where $f_3 > f_1 > f_2$. In principle the system is built up similar to the system in FIG. 3 but with the difference that an oscillator 23, a demodulator 24 and subtractors 25 and 26 are added. At the frequency $f_2$ the absorption in the sensor is at a maximum, and therefore the signal from the demodulator 24 is used as a measure of the light reflections in the optical system and is therefore subtracted from the signals on the outputs of the demodulators 18 and 19.

Figure 7:
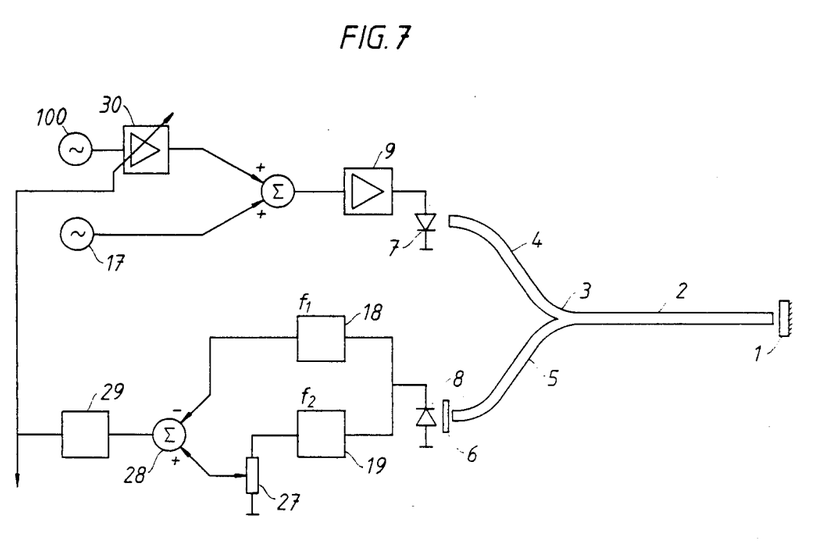
FIG. 7 shows another embodiment of a fiber optical measuring device according to the invention employing an amplitude regulator.

Instead of employing the quotient formation means in the measuring systems shown in FIGS. 3, 4 and 6, a regulator may be introduced which regulates the amplitude of the light source at the frequency $f_1$ (or $f_2$) so that the detector amplitudes at the two frequencies are controlled to a constant ratio. Such a measuring system is exemplified in FIG. 7, in which an output signal from a demodulator 19 is reduced passing it through a potentiometer 27. From this reduced value output signal is subtracted the output signal from a demodulator 18 in a subtractor 28. The output signal from the subtractor 28 gives an error signal which is supplied to a regulator 29 for controlling a variable amplifier 30.

Rise and fall times for photo-luminescence signals, which are obtained when excitation takes place, for example, with square pulses, are temperature-dependent for most semiconductor materials. The temperature dependence arises as a result of the temperature dependence of the parameters which control the magnitude of the luminescence signal. The amount and temperature dependence of these parameters may vary within very wide limits. A number of examples are given below.

Figure 8:
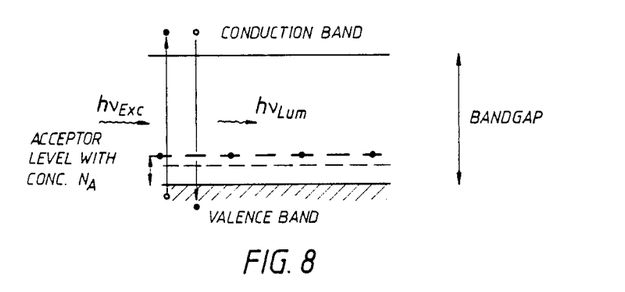
FIG. 8 is an energy level diagram for a sensor material showing band-to-band recombinations which cause luminescence signals.

If radiating band-to-band recombination gives rise to the luminescence signal (see FIG. 8), the system dynamics is determined by the following differential equation.

$$\frac{d\Delta n(t)}{dt} = U - \Delta n(t) \cdot R(T) \cdot P_0(T),$$

where T is the temperature, $\Delta n$ is the excess charge carrier concentration and U is the excitation density. That is, if U is a step signal with reference to the time coordinate, an exponential increase and decay of the luminescence signal is obtained with the time constant $$\tau = \frac{1}{R(T) \cdot P_0(T)} \cdot \text{(See page 11a)}$$

$P_0(T)$ is the hole concentration in the valence band and $R(T)$ the coefficient governing the band-to-band recombination. $P_0(T)$ is temperature dependent (in a temperature interval determined, among other things, by $E_A$, the binding energy of the acceptors) by the fact that the number of holes in, for example, a p-type material is determined by thermal excitation processes. The temperature dependence of $R(T)$ may be calculated with the so-called "detailed balance" method. The above-mentioned system can be realized by employing as sensor material, for example, GaAs doped to p-type with a substance from group II of the periodic system.

Figure 9:
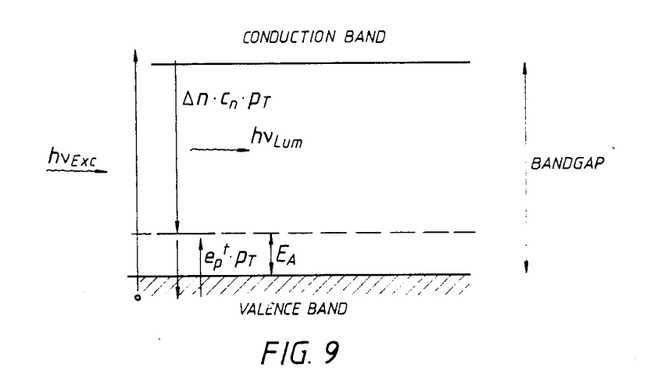
FIG. 9 shows another energy level diagram for a different sensor material which also produces luminescence.

Another process by which luminescence can be obtained as illustrated in FIG. 9. In this case the luminescence is obtained by recombination of holes generated via an energy level in the band gap. An example of suitable sensor material is ZnSe doped with Cu. The time constant for luminescence signal increase and decay is $$\tau = 1/(c_n \cdot P_T),$$

where $c_n$ is the recombination coefficient for electrons to the level. Since both $c_n(T)$ and $R_T(T)$ may be arranged temperature dependent, a temperature dependent dynamic is obtained also for this system. $e_p^t$ is the thermal emission rate of holes. $P_T$ is the concentration of unoccupied levels.

Figure 10:
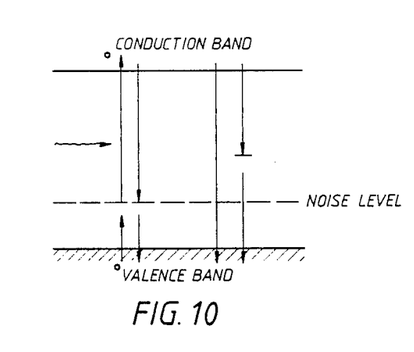
FIG. 10 shows an energy level diagram for a sensor material by which a temperature-dependent time constant for the absorption of the light can be obtained.

A temperature-dependent time constant for the absorption of the light can be obtained in a system as shown in FIG. 10. A semiconductor material doped to contain a level in the band gap is utilized. The photon-energy of the light is adapted so that the band-to-band excitation is negligible, but so that the dominating absorption takes place through excitations from the level to the conduction band. The absorption coefficient $\alpha$ can be designated as $$\alpha = \sigma_n^0 \cdot n_T.$$

where $\sigma_n^0$ is the optical cross-section for excitations from the level and $n_T$ is the number of levels covered with electrons. The intensity transmitted is proportional to $$T \simeq e^{-\alpha \cdot d}.$$

Figure 11:
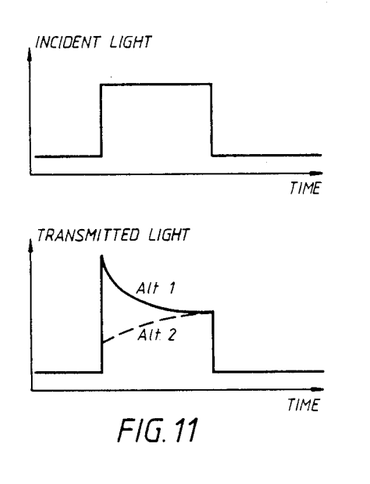
FIG. 11 shows the time dependence for varying illumination.

$n_T$, and therefore $\alpha$, are determined by the balance between excitation and recombination mechanisms (thermal and optical). d is thickness of the material through which the light travels. $\alpha$ may thus assume different values at different degrees of illumination, which results in T receiving a time dependence, for example as indicated by FIG. 11. This time dependence is different at different temperatures, depending on the temperature dependence of the parameters which determine $n_T(T, \Delta n)$.

The arguments set forth above are applicable to an arbitrary semiconductor material with one or more levels causing light absorptions.

Suitable materials for the luminescence sensors may comprise a semiconductor material selected from the group consisting of AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, with x and y respectively lying between 0 and 1, or ZnTe, ZnSe, ZnS, ZnO, CdTe, CdSe or CdS. GaP is doped with Zn and $O_2$ or Cd and $O_2$. ZnSe is doped with Cu or Mn.

These materials may be used for absorption sensors as well, doped with some dopant which gives rise to light absorption via levels. In particular may be mentioned II–VI semiconductors, doped with transition metals or rare soil type metals, which have high solubility.

The invention, as exemplified above, may be varied in many ways within the scope of the following claims.

What is claimed is:

1. A fiber optical measuring device for measuring a physical quantity comprising:
   a measuring transducer comprising a sensor material having at least one optical property dependent on the modulating frequency of light supplied thereto;
   an electronic unit; and
   light-conducting fiber means connecting the measuring transducer to the electronic unit;
   the electronic unit including
   light source means for transmitting excitation light via the fiber means to the sensor material;
   modulating means arranged so that said excitation light is modulated at at least one modulating frequency within a frequency range in which said optical property of the sensor material is influenced by the physical quantity to be measured, the light emanating from the sensor having at least one component dependent upon the physical quantity to be measured; and
   means for detecting said component of the modulated light emanating from the sensor material in response to excitation light at said one modulating frequency.

2. A fiber optical measuring device according to claim 1, in which said electronic unit comprises oscillating means for modulating the light source means with a frequency within a frequency range of said sensor material having an optical property affected by said physical property, said optical property having a phase and amplitude relationship to the excitation light from the light source dependent on said physical quantity to be measured, said detecting means comprises photo-detector means for receiving light from the sensor material, and a phase detector for measuring the phase shift obtained between light passing into and out of the sensor material, respectively.

3. A fiber optical measuring device according to claim 2, in which said oscillating means modulates said light source means at a first frequency and at a lower, second frequency, the physical quantity to be measured influencing the phase shift in the sensor material to a different extent at the first and second frequencies, and said electronic unit includes means for compensating for the time of travel of the light along said fiber means between the electronic unit and the transducer in dependence on the measured phase shifts at said first and second frequencies.

4. A fiber optical measuring device according to claim 3, in which said first and second frequencies are chosen such that the phase shift in the sensor material at said first frequency is dependent on the physical quantity to be measured and the phase shift at the other lower frequency is less dependent on, or substantially independent of, the physical quantity to be measured, and in which said compensating means uses the measured phase displacement at said second frequency for measuring the time of travel of the light along said fiber means between the electronic unit and the transducer.

5. A fiber optical measuring device according to claim 2, comprising a regulator for controlling the frequency of said oscillating means such that a constant phase shift is obtained between light passing into and out of the sensor material, respectively.

6. A fiber optical measuring device according to claim 1, in which the modulating means modulates said light source means at a first modulating frequency $f_1$ and at a second modulating frequency $f_2$, said physical quantity to be measured in the sensor material influencing the amplitude of light modulated with the modulating frequency $f_1$ to a greater extent than the amplitude of light modulated with the modulating frequency $f_2$, said detecting means comprises photo-detector means for receiving the light emanating from the sensor material, two electronic filters connected to the output of the photo-detector means for filtering-out detector signals with the modulating frequencies $f_1$ and $f_2$, and function means having input means for receiving signals from the outputs of said filters, and output means providing an output signal constituting a measuring signal for the physical quantity being measured.

7. A fiber optical measuring device according to claim 6, in which said function means comprises a quotient forming means for forming the quotient between the amplitudes of the detector signals with the modulating frequencies $f_1$ and $f_2$.

8. A fiber optical measuring device according to claim 6, in which said function means comprises a regulator which senses the difference between the filtered out detector signals with the modulating frequencies $f_1$ and $f_2$ and controls the amplitude of either of the modulating light signals with the modulating frequencies $f_1$ and $f_2$.

9. A fiber optical measuring device according to claim 7, in which said electronic filters comprise lock-in amplifier means with automatic synchronizing for compensation of the time of travel of the light via the fiber means between the electronic unit and the measuring transducer.

10. A fiber optical measuring device according to claim 9, in which said lock-in amplifier has two measuring channels, offset in phase 90° with respect to each other at the higher modulating frequency $f_1$, one of the measuring channels being used to measure, upon the zero passage of the signal, the phase dependence of the amplitude during the very synchronizing operation, the other measuring channel being used for obtaining the filtered-out detector signal, and the phase dependence of the amplitude in the two measuring channels being used to determine the direction of synchronizing.

11. A fiber optical measuring device according to claim 7, comprising a comparator for comparing the output from said quotient forming means with a reference value, and a regulator having an input connected to the output of the comparator and providing an output signal for controlling said modulating frequency $f_1$.

12. A fiber optical measuring device according to claim 1, in which the modulating means modulates the light source means at a first modulating frequency $f_1$, a second modulating frequency $f_2$ and a third modulating frequency $f_3$, said physical quantity to be measured in the sensor material influencing the amplitude of the light modulated with said first modulating frequency $f_1$ to a greater extent than the amplitude of the light modulated with said second and third modulating frequencies $f_2$ and $f_3$, said modulating frequencies being chosen so that $f_3 > f_1 > f_2$, and in which the detecting means comprises photo-detector means for receiving the light emanating from the sensor material, three electronic filters connected to the output of the photodetector means for filtering-out detector signals with the modulating frequencies $f_1$, $f_2$ and $f_3$, respectively, two electronic subtractors for subtracting one of said filtered-out detector signals from the other two filtered-out detector signals, function means having input means connected to the output of the said two electronic subtractors, and output means providing an output signal constituting a measuring signal for the physical quantity being measured.

13. A fiber optical measuring device according to claim 12, in which said function means comprises a quotient forming means for obtaining a quotient of the outputs of said two subtractors.

14. A fiber optical measuring device according to claim 12, in which said function means comprises a regulator, the output signal at the output of the regulator controlling the amplitude of either of the modulating light signals which does not correspond to the detector signal which is subtracted from the other two detector signals.

15. A fiber optical measuring device according to claim 1, in which said modulating frequency dependent optical property consists of luminescence, dependent on the modulating frequency of the excitation light.

16. A fiber optical measuring device according to claim 15, in which the dynamics of said modulating frequency dependent luminescence is temperature-dependent.

17. A fiber optical measuring device according to claim 1, in which said modulating frequency dependent property consists of the dependence of the light absorption on the modulating frequency of the excitation light.

18. A fiber optical measuring device according to claim 17, in which said modulating frequency dependent property is arranged to be obtained by excitation of levels located in the band gap of a semiconductor.

19. A fiber optical measuring device according to claim 1, in which the sensor material is selected from the group consisting of AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, with x and y respectively lying between 0 and 1, ZnTe, ZnSe, ZnS, ZnO, CdTe, CdSe and CdS.

20. A fiber optical measuring device according to claim 1, in which the sensor material comprises GaP doped with Zn and $O_2$.

21. A fiber optical measuring device according to claim 1, in which the sensor material comprises ZnSe doped with Cu.

22. A fiber optical measuring device according to claim 1, in which said component is the amplitude of the modulated light.

23. A fiber optical measuring device according to claim 1, in which said component is the phase position of the modulated light.

24. A fiber optical measuring device according to claim 1, in which the sensor material comprises GaP doped with Cd and $O_2$.

25. A fiber optical measuring device according to claim 1, in which the sensor material comprises ZnSe doped with Mn.

* * * * *